United States Patent [19]

Miller et al.

[11] 3,868,455

[45] Feb. 25, 1975

[54] CERTAIN BENZYL PURINES IN COMBINATION WITH CERTAIN BENZOYLACRYLANILIDES AS COCCIDIOSTATS

[75] Inventors: Brinton M. Miller, Middletown; Edward C. McManus, Plainfield, both of N.J.

[73] Assignee: Merck & Co., Inc., Rahway, N.J.

[22] Filed: Nov. 15, 1973

[21] Appl. No.: 416,335

[52] U.S. Cl.................. 424/253, 424/232, 424/324
[51] Int. Cl............................................. A61k 27/00
[58] Field of Search............................ 424/253, 324

[56] References Cited
FOREIGN PATENTS OR APPLICATIONS
2,128,600  10/1972  France

OTHER PUBLICATIONS

Chemical Abstracts, Vol. 43 (1949), p. 7192g.

*Primary Examiner*—Vincent D. Turner
*Attorney, Agent, or Firm*—Francis H. Deef; J. Jerome Behan; Edmunde D. Riedl

[57] ABSTRACT

The use of the 6-amino-(substituted benzyl) purines or their N'-oxides in combination with various benzoylacrylanilides reduces mortality and decreases lesion incidence of poultry exposed to coccidiosis inducing parasites. Poultry feed compositions comprising these 6-amino-(substituted benzyl)-purines or their N'-oxides in combination with benzoylacrylanilides are provided.

13 Claims, No Drawings

CERTAIN BENZYL PURINES IN COMBINATION WITH CERTAIN BENZOYLACRYLANILIDES AS COCCIDIOSTATS

SUMMARY OF THE INVENTION

This invention relates generally to the use of a combination of any one or more 6-amino-(substituted benzyl)purines or their N'-oxides together with any one or more of various benzoylacrylanilides in a poultry feed composition. The medicated poultry feed can then be administered to chickens and other domestic poultry and is useful in the treatment and prophylaxis of coccidiosis.

Coccidiosis is a common and widespread poultry disease caused by species of protozoan parasites of the genus Eimeria. The most important of these species are *E. maxima, E. acervulina, E. tenella, E. necatrix, E. brunetti, E. praecox,* and *E. mitis.* In turkeys, *E. meleagridis* and *E. adenoides* are also causative organisms of coccidiosis. When left untreated, the disease may lead to poor weight gain, reduced feed efficiency and high mortality. For these reasons, the control of coccidiosis is highly important not only to the poultry industry, but is of general importance since poultry is a valuable and economical source of high quality food protein.

Although *E. tenella* and *E. necatrix* cause the most lethal forms of the disease, it has recently been realized that infections due to other species, and particularly to the so-called intestinal species such as *E. acervulina, E. brunetti,* and *E. maxima,* present a serious economic problem. It has further been found that a particular coccidiostat is frequently much more effective against some species than against others. Sometimes the effectiveness is so limited that a particular coccidiostat could be regarded as species specific. Much research effort has been expended in an effort to discover a single chemical entity that could serve as a universal coccidiostat. Unfortunately, the spectrum of activity shown by many compounds thus far discovered is not uniform. Some compounds although excellent for combatting coccidiosis causing species infesting the caeca do not show effectiveness against intestinal species, the reverse situation also being true.

Therefore, a surprising feature of this invention is that the combination of the 6-amino-(substituted benzyl)purines or their N'-oxides together with the benzoylacrylanilides present a wide spectrum of activity which is effective against not only many species of the causative organism, but also attack the causative organism in various stages of its life cycle thereby lowering the rate or reinfection in flocks. It is this latter advantage which is one very important aspect of this invention. Reinfection of flocks is often caused by the failure of previously known coccidiostat compositions to inhibit oocyst sporulation. Oocysts are the external phase of the parasite and after sporulating become the form by which infection is spread when they are ingested by uninfected members of the same flock or succeeding flocks.

Furthermore, the benzoylacrylanilides are highly effective against *E. tenella* as well as *E. necatrix,* and are consequently of great value, but the same compounds are so much less active or even inactive against strains of other species that they could be regarded as species specific coccidiostats. For this reason, a considerable amount of research has been carried out in an effort to find compounds primarily effective against the intestinal species (*E. brunetti, E. acervulina, E. maxima*).

Therefore, an object of this invention is to provide a poultry feed composition which can be administered to poultry and will control coccidiosis. Another object is to provide animal feed supplements and animal feeds containing compounds active against coccidiosis and methods of treating coccidiosis with such compositions. An additional object is the provision of a "broad spectrum" poultry feed composition having broad spectrum activity against coccidiosis including inhibition of oocyst sporulation. Other objects will become evident from the following discussion of the invention.

According to the present invention, it has now been found that the use of one or more 6-amino-(substituted benzyl)-purines or their N'-oxides and in particular those having the formula:

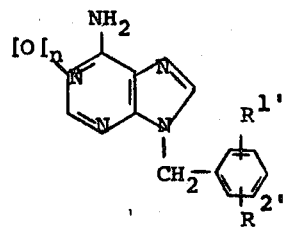

(FORMULA I)

wherein $n$ is 0 or 1, and (a) $R^{1'}$ and $R^{2'}$, independently are of the group consisting of hydrogen, halogen, i.e. chlorine, bromine, iodine or fluorine, nitro, and trihalomethyl, provided that at least one of such substituents is other than hydrogen and no more than one of such substituents is of the group consisting of nitro and trihalomethyl, and $R^{1'}$ and $R^{2'}$ are located in the 2 and 6 positions on the carbocyclic portion of the compound, or (b) $R^{1'}$ and $R^{2'}$ are both methyl and are located in the 3 and 4 positions on the carbocyclic ring in combination with one or more of the benzoylacrylanilide hereinafter described provides superior control of coccidiosis.

Preferred purine compounds for use in the combination are those of the above formula where one of the substituents $R^1$ and $R^2$ is hydrogen or where both of the substituents are halogen, either the same or different, or methyl.

The most preferred purine derivatives are those where $R^{1'}$ and $R^{2'}$ are halogen, especially 6-amino-9-(2,6-dichlorobenzyl) purine, and 6-amino-9-(2-chloro-6-fluoro-benzyl) purine and their corresponding N'-oxide, i.e., 6-amino-9-(2,6-dichlorobenzyl) purine-N'-oxide and 6-amino-9-(2-chloro-6-fluorobenzyl) purine-N'-oxide.

The chemical synthesis of 6-amino-(substituted benzyl) purines together with their N'-oxides is fully described in French Pat. No. 2,128,600, published Oct. 20, 1972.

According to this invention, it has been found that substituted benzoylacrylanilides of Formula II below are very effective in the prevention and treatment of coccidiosis when employed in combination with the above referred to purine compounds.

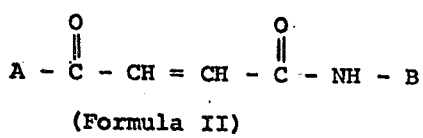

(Formula II)

In the compounds of Formula II, A represents:

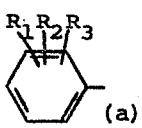 (a)   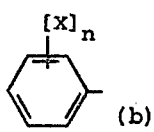 (b)

wherein formula (a) $R_1$, $R_2$ and $R_3$ are independently hydrogen, halo, nitro, loweralkylsulfide, loweralkylsulfonyl, loweralkyl, loweralkoxy, loweralkanoylamino, trihaloloweralkyl, cyano or hydroxyl; provided that at least one of $R_1$, $R_2$ and $R_3$ is other than nitro; and in formula (b) X is halogen; and n is an integer of 4 to 5.

In Formula II above, B represents:

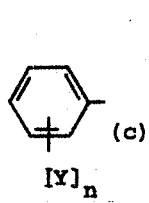 (c)   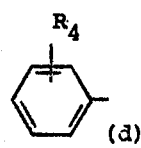 (d)   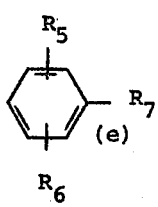 (e)

wherein formula (c), Y is halogen and n is as previously defined; in formula (d), $R_4$ is cyano, halo, nitro, loweralkyl, loweralkoxy, loweralkylsulfide, trihaloloweralkyl, or hydroxyl; and in formula (e) $R_5$ and $R_6$ are independently loweralkyl, loweralkoxy, trihaloloweralkyl or halo and $R_7$ is halo, nitro or hydrogen.

As used in this specification, the prefix "lower" is meant to include groups having from 1 to 4 carbon atoms, e.g., methyl and ethyl, propyl and butyl, including the isomers of propyl and butyl. Also, in this specification the term "halo" is intended to include fluoro, chloro, bromo and iodo.

Referring to those substituents comprising A of Formula II, where the phenyl groups of formula (a) above is mono-substituted, that is where $R_1$ and $R_2$ are hydrogen, $R_3$ includes halo, nitro, loweralkylsulfide, loweralkylsulfonyl, loweralkyl, loweralkoxy, loweralkanoylamino, trihaloloweralkyl, cyano or hydroxyl groups. Among preferred mono-substituents of formula (a) are those occupying the 4-position, especially 4-loweralkoxy and 4-loweralkanoylamine, and most preferably 4-methoxy and 4-acetamido.

Where the phenyl group, of formula (a) is di-substituted, that is where $R_1$ is hydrogen, then $R_2$ and $R_3$ are independently halo, nitro, loweralkylsulfide, loweralkylsulfonyl, loweralkyl, loweralkoxy, loweralkanoylamino, trihaloloweralkyl, cyano or hydroxyl. Of these, it is preferred that $R_2$ and $R_3$ are halo, loweralkoxy or loweralkyl and most preferably chloro, methoxy or methyl. The substituents $R_2$ and $R_3$ can be in any position of the phenyl group relative to each other or its attachment to the carbonyl group. Preferably, however, $R_2$ and $R_3$ are present in either the 2- and 4-positions, or in the 3- and 4-positions, and most preferably represent the substituents 3,4-dichloro, or 2,4-dichloro, 3,4-dimethoxy, 2,4-dimethoxy, and 4-chloro-3-methyl.

In formula (b), preferred embodiments include those where X is chloro and n is 4, i.e., where A is tetrachlorophenyl, especially 2,3,5,6-tetrachlorophenyl; and where X is fluoro and n is 5, i.e., pentafluorophenyl.

Referring now to those substituents comprising B of Formula I, it has been found that in formula (c), the more suitable substituents include those where Y is chloro and n is 4 such that B is 2',3',5',6'-tetrachlorophenyl, and where Y is fluoro and n is 5 which is pentafluorophenyl. In formula (d) $R_4$ is most suitably loweralkyl, especially methyl and can be in the 2',3'- or 4'-positions. In formula (e) when $R_7$ is preferably hydrogen, $R_5$ and $R_6$ are most suitably loweralkyl, particularly methyl. $R_5$ and $R_6$ can be in any position relative to each other or to its attachment to the amido nitrogen, but especially desirable are those compounds where $R_7$ is hydrogen and $R_5$ and $R_6$ are in the 2'- and 6'-positions or the 3'- and 5'-positions. Most preferred are 2',6'-dimethyl or 3',5'-dimethyl.

Highly preferred benzoylacrylanilides of the combination of this invention are those where B is mono-substituted with 2-loweralkyl and A is either 4-loweralkoxyphenyl or 4-loweralkanoylaminophenyl such as, 3-(4-methoxybenzoyl)-2'-methylacrylanilide, and 3-(4-acetamidobenzoyl)-2'-methylacrylanilide or A is di-substituted in the 2,4-positions or the 3,4-position such as 3-(3,4-dimethoxybenzoyl)-2'-methylacrylanilide,
3-(3,4-dichlorobenzoyl)-2'-methylacrylanilide,
3-(4-chloro-3-toluyl)-2'-methylacrylanilide,
3-(3-chloro-4-toluyl)-2'-methylacrylanilide, and
3-(2,4-dichlorobenzoyl)-2'-methylacrylanilide.

Equally highly preferred are those where B is di-substituted phenyl with loweralkyl in the 2',6'-positions or the 3',5'-positions and A is either 4-loweralkoxyphenyl or 4-loweralkanoylaminophenyl such as,
3-(4-methoxybenzoyl)-2',6'-dimethylacrylanilide,
3-(4-acetamidobenzoyl)-2',6'-dimethylacrylanilide,
3-(4-methoxybenzoyl)-3',5'-dimethylacrylanilide and
3-(4-acetamidobenzoyl)-3',5'-dimethylacrylanilide, or A is di-substituted in the 2,4-positions or the 3,4-positions such as,
3-(3,4-dichlorobenzoyl)-2',6'-dimethylacrylanilide,
3-(4-chloro-3-toluyl)-2',6'-dimethylacrylanilide,
3-(3-chloro-4-toluyl)-2',6'-dimethylacrylanilide,
3-(2,4-dichlorobenzoyl)-2',6'-dimethylacrylanilide,
3-(3,4-dichlorobenzoyl)-3',5'-dimethylacrylanilide,
3-(4-chloro-3-toluyl)-3',5'-dimethylacrylanilide,
3-(3-chloro-4-toluyl)-3',5'-dimethylacrylanilide, and
3-(2,4-dichlorobenzoyl)-3',5'-dimethylacrylanilide.

As described more fully below, these benzoylacrylanilides are prepared by the reaction of an appropriately substituted benzoylacrylic acid,

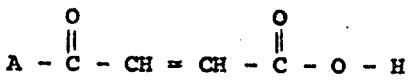

(Formula III)

where A is as previously defined with an appropriate aniline derivative

where B is as previously defined in the presence of a coupling reagent such as dicyclohexylcarbodiimide, phosphorous oxychloride/triethylamine complex, and the like.

Thus, in accordance with this invention, it has now been found that mixtures of one or more 6-amino-(substituted benzyl)-purines or their N'-oxides together in combination with one or more of a benzoylacylanilide type coccidiostat, when administered to poultry in suitable carriers, control coccidiosis.

The compositions of this invention are employed for both controlling and treating coccidiosis by oral administration to poultry susceptible to the disease, either in the drinking water or feed.

It is preferred, however, to disperse the compositions of this invention in the finished feed of the animals, and to administer the medicated feed, ad libitum to the birds. Good results against coccidiosis are achieved with feedstuff containing as the purine component in the combination from about 0.001 percent to 0.008 percent by weight of 6-amino-(substituted benzyl) purine and their N'-oxides. The preferred range is between 0.002 to 0.006 percent in the feed. Levels in poultry feed are here expressed in terms of percent by weight concentration of the total feed including the coccidiostat compositions of this invention.

In combination with the above dosage levels of 6-amino-(substituted benzyl) purine or their N'-oxides, the finished feed also comprises at least one of the benzoylacrylanilide coccidiostats, at a dosage level of from 0.002 to 0.1 percent by weight of the feed. The preferred dosage level of the benzoylacrylanilide coccidiostat in the compositions of our invention is from 0.003 to 0.025 percent by weight of the feed.

The finished feed in which the above-described levels of each of the components are employed is a nutritionally adequate one containing sources of carbohydrate, protein, fat, vitamins, minerals and other nutritional factors commonly employed in commercial poultry raising. In addition, other poultry feed additives can be employed in the compositions.

In addition to administration via the solid feedstuff, the compositions of the invention may be administered to poultry by incorporation in the drinking water. The preferred dose levels in the drinking water are usually somewhat less than those employed in a solid feed inasmuch as poultry drink about twice as much as they eat. The operable level in drinking water is from 0.001 to 0.008 percent by weight of 6-amino-(substituted benzyl) purines or their N'-oxides, the preferred range being 0.001 to 0.004 percent by weight. The amount of benzoylacrylanilide is 0.001 to 0.1 percent and preferably 0.0015 to 0.0125 percent by weight. Administration via the drinking water is of advantage when using the compound therapeutically rather than prophylactically. For this purpose it is convenient to prepare dispersible or water-soluble powders in which 6-amino-(substituted benzyl) purines and their N'-oxides are intimately dispersed in a suitable water-soluble or dispersible liquid of solid carrier such as dextrose, sucrose, dimethylsulfoxide, or other suitable non-toxic carriers, at concentrations of from about 0.03 to about 25 percent by weight. These solids may then be conveniently added to the drinking water by the poultry grower.

A typical drinking water formulation contains 6-amino-(substituted benzyl) purines or their N'-oxides, 0.002 percent; a benzoylacrylanilide 0.006 percent, dextrose, 30 percent; propylene glycol, 20 percent; dimethylpolysiloxane, 0.002 percent; polyoxyethylene sorbitan monooleate, 0.2 percent; water, to 100 percent.

According to a further aspect of this invention, there are provided compositions comprising poultry feed supplements or additives containing 6-amino-(substituted benzyl) purines and their N'-oxides previously described together with a benzoylacrylanilide as an effective coccidiostat. In such compositions the compounds are mixed with or dispersed in an orally ingestible carrier vehicle that is non-toxic to the poultry and compatible with the finished feedstuff. These feed supplements contain a significantly higher percentage of 6-amino-(substituted benzyl) purines or their N'-oxides and a benzoylacrylanilide than does the finished feed, and are mixed with or blended into the feedstuff before administration to the poultry. In order to assure uniform distribution of the compounds in the finished feed, it is customary to employ an intermediate dilution step in which the supplement is blended with a portion of the final feed, and this "intermediate mix" is then added to the remainder of the feed with adequate mixing. The combination described hereinabove may be formulated into feed supplement compositions containing from about 0.05 percent to about 50 percent by weight of the combination. It is preferred in the industry to use from about 1–5 pounds of such a supplement per ton of feedstuff. It will, therefore, be appreciated that the preferred supplement concentration will depend to a large extent on the final use level desired. With the compounds of this invention, feed supplement compositions containing from about 1.0 to about 20 percent by weight of the combination of active ingredients are preferred.

Diluent or carrier vehicles that may be used in these poultry feed supplements are solid orally ingestible poultry feed additives such as corn meal, distillers' dried grains, ground oyster shell, citrus meal fermentation residues, wheat shorts, wheat middlings, molasses solubles corn germ meal, corn gluten feed, soybean meal, dehulled soya flour, crushed limestone, fermentation mycelia, edible vegetable substances and the like. Nutritive carriers are preferred since the finished feed is benefitted thereby. Cereals are the preferred carriers.

These supplements are incorporated in the poultry feed either directly before or after an intermediate dilution or blending step.

It will likewise be understood by those skilled in this art that special feed supplement formulations and finished animal feeds containing vitamins, antibiotics, growth-promoting agents and other nutritional substances may include one or more compounds of this invention. The following is a typical product of this type to which the combination of compounds of this invention can be added so as to comprise from 1 to 50 percent of the total weight.

| Ingredients: | Amount/lb. of Supplement grains |
|---|---|
| Riboflavin | 0.64 g. |
| DL-calcium pantothenate | 2.10 |
| Niacin | 3.67 |
| Choline chloride | 50.00 |

-Continued

| | Amount/lb. of Supplement grains |
|---|---|
| Vitamin $B_{12}$ concentrate | 1.30 mg. |
| Procaine penicillin | 0.84 g. |
| Vitamin A (100,000 u./g.) | 3.38 |
| Vitamin $D_3$ (200,000 u./g.) | 0.68 |
| Arsanilic acid | 18.36 |
| Butylated hydroxy toluene | 23.15 |
| DL-methionine | 23.15 |
| Distillers' grains to 1 pound | |

Animal feed supplements having the following compositions which include preferred combinations of coccidiostats, are prepared by intimately mixing the benzoylacrylanilide, the 6-amino-(substituted benzoyl)purine, and the particular edible solid diluent or diluents.

| | | Lbs. |
|---|---|---|
| A. | 3-(4-Chloro-3-toluoyl)-2',6'-dimethylacrylanilide | 7.5 |
| | 6-amino-9-(2,6-dichlorobenzyl)purine | 2.0 |
| | Distillers' dried grains | 90.5 |
| B. | 3-(3,4-Dichlorobenzoyl)-2',6'-dimethylacrylanilide | 5.0 |
| | 6-amino-9-(2,6-dichlorobenzyl)purine | 3.0 |
| | Soybean mill feed | 50.0 |
| | Fine soya grits | 42.0 |
| C. | 3-(3,4-Dimethoxybenzoyl)-2',6'-dimethylacrylanilide | 10.0 |
| | 6-amino-9-(2,6-dichlorobenzyl)purine-N'-oxide | 6.0 |
| | Molasses solubles | 84.0 |
| D. | 3-(3,4-Dichlorobenzoyl)-2',6'-dimethylacrylanilide | 15.0 |
| | 6-amino-9-(2-chloro-6-fluorobenzyl)pyrine | 10.0 |
| | Corn distillers' dried grains | 50.0 |
| | Corn germ meal | 25.0 |
| E. | 3-(2,4-Dichlorobenzoyl)-2',6'-dimethylacrylanilide | 15.0 |
| | 6-amino-9-(2,6-dichlorobenzyl)purine | 5.0 |
| | Wheat shorts | 30.0 |
| | Corn distillers' dried grains | 50.0 |
| F. | 3-(4-Acetamidobenzoyl)-2',6'-dimethylacrylanilide | 22.5 |
| | 6-amino-9-(2-chloro-6-fluorobenzyl)purine-N'-oxide | 7.5 |
| | Corn distillers' dried grains | 70.0 |
| G. | 3-(3,4-Dimethoxybenzoyl-2',6'-dimethylacrylanilide | 15.0 |
| | 6-amino-9-(2,6-dichlorobenzyl)purine | 10.0 |
| | Corn distillers' dried grains | 75.0 |

The benzoylacrylanilides employed in the anticoccidial compositions of this invention are prepared by reacting the appropriately substituted benzoylacrylic acid with the appropriately substituted aniline in the presence of a coupling reagent. Most suitably, the benzoylacrylanilide is prepared by reaction of a solution of the corresponding benzoylacrylic acid and aniline with phosphorous oxychloride/triethylamine complex. The complex is best prepared in situ. The preferred procedure involves treating a tetrahydrofuran solution of one equivalent of the substituted benzoylacrylic acid and one equivalent of the substituted aniline with one equivalent of phosphorous oxychloride followed by the addition of two equivalents of triethylamine.

When electron withdrawing groups, or groups which greatly hinder reaction are present on the aniline compound, an improved yield is obtained by condensing the more reactive substituted benzoylacryl halides with an excess of the substituted aniline. Reactions of this type and the preparation of acyl halides are familiar to those skiled in the art utilizing acylating agents such as phosphorous pentachloride or thionylchloride. Of the starting materials used for preparing the compounds of this invention the substituted aniline compounds are known.

Benzoylacrylic acid is also known, and the substituted benzoyl acrylic acids can be prepared from the appropriately substituted benzene by condensation with maleic anhydride. This reaction is performed by standard techniques utilized in conducting a Friedel-Crafts condensation employing the usual Lewis acid catalysts, especially aluminum chloride as outlined in Papa, Journal of the American Chemical Society, 70:3356 (1946), and Cramer, Journal of the American Pharmaceutical Association, 37:439 (1948).

When preparing substituted benzoylacrylic acids where the substituents present on the benzene reactant would tend to hinder its condensation with the maleic anhydride, it is preferable to employ the following preparative method. The substituted benzene is reacted with dichloroacetyl chloride, employing at least an equivalent amount of the diacetyl chloride. The reactants are admixed in the presence of a Lewis acid catalyst, such as, aluminum chloride. After reaction at 50°C. to 90°C. for a period of from 3–10 hours the substituted acetophenone is isolated. This is in turn reacted with an alkali alkoxide suitably sodium methoxide in a suitable solvent such as methyl alcohol at room temperature. By suitable solvent is meant one which does not react irreversibly with reactants as products. After about two hours, the reaction is generally complete and the dialkoxy derivative isolated. Upon treatment with acid, the glyoxal hydrate is obtained and reacted by condensation with malonic acid followed by decarboxylation thereby forming the desired substituted benzoylacrylic acid. When preparing substituted benzoylacrylic acids where the substituents present on the benzene reactant would prevent condensation with maleic anhydride or produce an undesirable isomer of the substituted benzoylacrylic acid, it is preferable to employ the following preparative procedure. The corresponding substituted acetophenone in aqueous acetic acid is oxidized with an equivalent amount of selenium dioxide ($SeO_2$) at 50°C. to 150°C. for ½ to 3 hours. The corresponding substituted phenyl glyoxal hydrate is isolated and converted to the benzoylacrylic acid as described above.

The following examples are set forth to illustrate the invention and are not to construed as limitations thereon.

Preparation of Benzoylacrylic Acids

EXAMPLE I

4-Nitrobenzoylacrylic Acid

Step 1

4-Nitrophenylglyoxal Hydrate

A solution of 67 g. (0.60 moles) of $SeO_2$ in 60 ml. of water and 300 ml. of glacial acetic acid is mixed with 100 g. (0.60 moles) of p-nitroacetophenone and refluxed for one hour.

The solution is cooled and filtered. The residue is washed with acetic acid and the filtrate and washes are combined and concentrated to a residue. This residue is distilled, the distillate dissolved in boiling water, cooled and filtered. There is obtained 22.5 g of 4-nitrophenylglyoxal hydrate a yield of 19 percent having a melting point of 87°C.–90°C.

Step 2

3-(4-Nitrobenzoyl)acrylic Acid

A solution of 28 g. (0.42 moles) of p-nitrophenylglyoxal hydrate in 75 ml. of pyridine was stirred at 10°C.–15°C. while 15 g. (0.144 moles) of malonic acid was added. The mixture is stirred under nitrogen for about five hours and then left at room temperature overnight. After standing the mixture, which contained a precipitate, is treated with aqueous 5% $Na_2CO_3$ (350 moles) with agitation. The resulting mixture is washed several times with $CH_2Cl_2$ and then acidified with 6N HCl. The aqueous phase is decanted from the precipitate which forms and extracted with $CH_2Cl_2$, these extracts then being used to dissolve the precipitate. The precipitate is dissolved in hot $CH_2Cl_2$, filtered, diluted with hexane and cooled to give two crops of product. There was obtained a 8.9 g., a yield of 28 percent having a melting point of 165°C–166.5°C.

EXAMPLE II 3-(4-Methylthiobenzoyl)acrylic Acid

A suspension of 66 g. (0.500 moles) of $AlCl_3$ in about 600 ml. of methylene chloride is stirred with 20 g. (0.20 moles) of maleic anhydride is added. The solution of the complex is decanted off and is stirred while 25 g. (21 ml.) of methyl phenyl sulfide was added. The solution is refluxed for six hours and then left to stand overnight.

A solution of 100 ml. of concentrated HCl in one liter of ice water is added and the mixture stirred. The organic layer is then separated, washed with water, and extracted with aqueous sodium bicarbonate. The extract is washed with ether and then acidified with 6N HCl. The precipitate is filtered and washed with water.

The precipitate is dissolved in ethyl acetate, washed with water, dried, reduced to a small volume and diluted with hexane. The 3-(4-methylthiobenzoyl)acrylic acid is obtained in two crops 10 g. (23%), m.p. 162°C.–163°C.

EXAMPLE III 3-(2,4,5-Trichlorobenzoyl)acrylic Acid

Step 1

A suspension of 40 g. (0.30 moles) of aluminum chloride in 200 ml. of tetrachloroethylene is treated with a solution of 28.8 ml. (44.2 g.; 0.30 moles) of dichloroacetylchloride in 30 ml. of tetrachloroethylene. The solution is stirred for 15 minutes and then 50 ml. (0.40 moles) of 1,2,4-trichlorobenzene is added. The mixture is then heated to 90°C. for 6 hours, then is poured into an ice-water mixture containing 90 ml. of concentrated HCl. The mixture is shaken and the aqueous phase extracted with methylene chloride. The extracts are added to the organic phase, washed with water and an aqueous solution of sodium bicarbonate, followed by a wash with a saturated sodium chloride solution. The solution is shaken with activated cchar-coal then filtered, concentrated to a residue and distilled under vacuum.

Step 2

The pentachloroacetophenone from Step 1 is added to a solution of 13 g. (0.241 moles) of sodium methoxide in 200 ml. of methanol. This mixture is refluxed for 2 hours, then cooled and filtered giving 7.8 g. solid. The filtrate is concentrated to a residue and taken up with methylene chloride and washed with 0°C. water, 2% HCl and saturated sodium chloride. The dried solution is treated with activated charcoal to give a residue of 20.8 g. Upon trituration with petroleum ether followed by filtration and stripping of solvent, 7.2 g. of crude product are obtained which after recrystallization from ether gave 4.1 g. The residue of 13 g. is chromatographed on silica gel and an additional 5.3 g. product is obtained.

Step 3

This 9.4 g. (0.033 mole) from Step 2 is dissolved in 60 ml. of dioxane and 60 ml. of 6N HCl is added. The mixture is then heated to 80°C. After 2 hours, the reaction mixture is cooled and extracted with methylene chloride, which extracts are combined and washed with saturated sodium chloride. There was obtained 9.3 g. of product.

Step 4

This product was dissolved in 25 ml. of pyridine and mixed with a solution of 3.75 g. (0.036 moles) of malonic acid in 25 ml. of pyridine. This reaction mixture is stirred overnight at room temperature. After 22 hours, the mixture is cooled and treated with 150 ml. of cold 5% $Na_2CO_3$. The solution is washed with benzene and methylene chloride and acidified with 6N HCl. The product is filtered, washed with water and recrystallized from ethyl acetatehexane. A total weight of 1.30 g. in three crops is obtained.

EXAMPLE IV 3-(4-Nitrobenzoyl)-2',6'-dimethylacrylanilide

10 G. of 4-nitrobenzoylacrylic acid (0.045 moles) from Example I is dissolved in 200 ml. of dry tetrahydrofuran and 7.0 ml. of 2,6-xylidine with cooling and stirring. Then, in rapid succession, there is added 5.2 ml. of phosphorous oxychloride ($POCl_3$) and 17 ml. of triethylamine. The mixture becomes dark and the temperature rises to 35°C. After the reaction moderates and the temperature falls to 20°C., the mixture is stirred for 2 ½ hours at room temperature.

The mixture is diluted with about 350 ml. of water and concentrated. A product oils out and then crystallizes. It is filtered, washed with water, and then with ether.

The product was put through a column of 350 g. of silica gel and eluted with 1 ½% methanol/$CH_2Cl_2$. The product is collected, stripped of excess solvents, and diluted with hexane. The product after being filtered, is slurried in ethylacetate and again filtered. After an ether wash, the 3-(4-nitrophenyl)-2',6'-dimethylacrylanilide is dried yielding 5.3 g. (36%) having a melting point of 210°C.–212°C.

EXAMPLE V 3-(3,4-Dichlorobenzoyl)-2',6'-dimethylacrylanilide

A solution of 6.12 g. (0.025 moles) of 3,4-dichlorobenzoylacrylic acid and 4.0 ml. (3.94 g., 0.0325 moles) of 2,6-xylidine in 125 ml. of tetrahydrofuran is cooled to 5°C. and treated in succession with 3.0 ml. (5 g., 0.0328 moles) of POCl₃ and 10 ml. (7.25 g., 0.072 moles) of triethylamine. The temperature rises to 25°C. and then falls to 20°C. After stirring for 1 hour, the reaction mixture is diluted with water and stripped of solvent. A semi-crystalline solid is obtained which is washed with water, then slurried with ethyl acetate. After filtering and washing with ether, 2.8 g. of 3-(3,4-dichlorobenzoyl)-2',6'-dimethylacrylanilide is obtained having a melting point of 213°C.–215°C.

The following additional compounds are prepared by employing POCl₃ as a coupling reagent in accordance with the method of the above Example V. An analogous quantity of the appropriate benzoylacrylic acid or substituted benzoylacrylic acid is employed in the manner of the 3,4-dichlorobenzoylacrylic acid of Example V. Likewise, an analogous quantity of the appropriately substituted aniline is employed in the manner of 2,6-xylidine. Thus, to prepare 3-(benzoyl)-2',5'-dimethylacrylanilide there is used an equivalent amount of benzoylacrylic acid in place of the 3,4-dichlorobenzoylacrylic acid and an equivalent amount of 3,5-xylidine in place of the 2,6-xylidine.

| Compounds | Melting Points |
|---|---|
| 3-(4-Trifluoromethylbenzoyl)-2',6'-dimethylacrylanilide | 189°–191°C. |
| 3-(Benzoyl)-2',5'-ditrifluoromethylacrylanilide | 175°–177°C. |
| 3-(3,4-Dichlorobenzoyl)-3',5'-dimethylacrylanilide | 166°–167°C. |
| 3-(Benzoyl)-4'-nitroacrylanilide | 266°–268°C. (decomposes) |
| 3-(Benzoyl)-4'-chloroacrylanilide | 211°–213°C. |
| 3-(Benzoyl)-4'-cyanoacrylanilide | 224°–225°C. |
| 3-(Benzoyl)-3',5'-dimethylacrylanilide | 158°–159°C. |
| 3-(4-Chlorobenzoyl)-2',6'-dimethylacrylanilide | 205°–207°C. |
| 3-(4-Bromobenzoyl)-2',6'-dimethylacrylanilide | 211°–213°C. |
| 3-(3-Nitrobenzoyl)-2',6'-dimethylacrylanilide | 211°–212°C. |
| 3-(4-Nitrobenzoyl)-2',6'-dimethylacrylanilide | 210°–212°C. |
| 3-(2,3,4-Trichlorobenzoyl)-2',6'-dimethylacrylanilide | 242°–248°C. |
| 3-(Benzoyl)-4'-nitroacrylanilide | 266°–268°C. (decomposes) |
| 3-(Benzoyl)-4'-chloroacrylanilide | 211°–213°C. |
| 3-(Benzoyl)-4'-cyanoacrylanilide | 224°–225°C. |
| 3-(Benzoyl)-3',5'-dimethylacrylanilide | 158°–159°C. |
| 3-(4-Chlorobenzoyl)-2',6'-dimethylacrylanilide | 205°–207°C. |
| 3-(4-Bromobenzoyl)-2',6'-dimethylacrylanilide | 211°–213°C. |
| 3-(3-Nitrobenzoyl)-2',6'-dimethylacrylanilide | 211°–212°C. |
| 3-(4-Nitrobenzoyl)-2',6'-dimethylacrylanilide | 210°–212°C. |
| 3-(2,3,4-Trichlorobenzoyl)-2',6'-dimethylacrylanilide | 242°–248°C. |
| 3-(3,4-Dimethoxybenzoyl)-2',6'-dimethylacrylanilide | 222°–225°C. |
| 3-(4-Methoxybenzoyl)-2',6'-dimethylacrylanilide | 194°–195°C. |
| 3-(3-Methyl-4-chlorobenzoyl)-2',6'-dimethylacrylanilide | 182°–184°C. |
| 3-(4-Acetamidobenzoyl)-2',6'-dimethylacrylanilide | 276°–278°C. |
| 3-(2,4-Dichlorobenzoyl)-2',6'-dimethylacrylanilide | 224°–226°C. |
| 3-(2,4,5-Trichlorobenzoyl)-2',6'-dimethylacrylanilide | 238°–240°C. |
| 3-(Benzoyl)-3',5'-dimethylacrylanilide | 160°–161°C. |
| 3-(Benzoyl)-4'-methoxyacrylanilide | 162°–164°C. |
| 3-(Benzoyl)-4'-trifluoromethylacrylanilide | 215°–217°C. |
| 3-(Benzoyl)-2'-methylacrylanilide | 168°–169°C. |
| 3-(Benzoyl)-4'-ethoxyacrylanilide | 167°–168°C. |
| 3-(Benzoyl)-4'-methylthioacrylanilide | 167°–168.5°C. |
| 3-(Benzoyl)-4'-hydroxyacrylanilide | 220°–222°C. |
| 3-(Benzoyl)-2',4',6'ltrimethylacrylanilide | 212°–213°C. |
| 3-(Benzoyl)-2',4',6'-trimethylacrylanilide | 212°–213°C. |
| 3-(Benzoyl)-3'-cyanoacrylanilide | 184°–185°C. |

EXAMPLE VI 3-(4-Methylthiobenzoyl)-2',6'-dimethylacrylanilide

A solution of 11 g. of the acid from Example II (0.050 moles) and 7.6 g. (0.062 moles) of 2,6-xylidene in 250 ml. of tetrahydrofuran was cooled to 5°C. and treated in rapid succession with 9.6 g. (0.062 moles) of POCl₃ and 13.6 g. (0.136 moles) of triethylamine. This mixture is warmed to 23°C. with stirring for an hour, then diluted with water and concentrated to remove the tetrahydrofuran. The product is filtered and washed first with water, then with ethyl acetate and ether. There was obtained 7.8 g. of 3-(4-methylthiobenzoyl)-2',6'-dimethylacrylanilide, a yield of 43% having a melting point of 216°C.–217°C.

EXAMPLE VII 3-(4-Methylsulfonyl)-2',6'-dimethylacrylanilide

A suspension of 650 mg. (0.002 moles) of methylthioacrylanilide from Example VI in 40 ml. of CH₂Cl₂ containing one ml. of methanol is treated with 890 mg. (0.0044 moles) of 85 percent m-chloroperbenzoic acid in 20 ml. of CH₂Cl₂. After standing overnight, the mixture containing a precipitate is stirred with 10 ml. of aqueous 10% NaHCO₃ and filtered. The solid is washed with water and the filtrate separated. The organic phase is washed with water. The original precipitate is dissolved in methylene chloride and the solution combined with the original methylene chloride solution. These solutions are filtered, and then partially stripped of solvent, and diluted with hexane. There was obtained 540 mg. of 3-(4-methylsulfonyl)-2',6'- dimethylacrylanilide having a melting point of 222°C.-228°C.

EXAMPLE VIII

3-Benzoyl-2',6'-dichloroacrylanilide

A stream of nitrogen is passed through a flask containing 12.5 g., phosphorous pentachloride. With cooling and agitation, 10.6 g. (0.060 moles) of 3-benzoylacrylic acid is added. After a vigorous evolution of hydrogen chloride and with continued cooling the reaction mixture forms a homogeneous liquid which is stirred for an additional 15 minutes. To the reaction mixture is then added 150 ml. of diethyl ether followed by 38.9 g. (0.24 moles) of 2,6-dichloroaniline. The reaction mixture is stirred for an additional ½ hour and then allowed to return to room temperature over a 2 ½ hour period. Then the reaction mixture is treated with an ice and water mixture. The reaction mixture is stirred vigorously for 20 minutes and the solids then filtered and washed with water followed by an ether wash. The solids are taken up with $CHCl_3$, dried over magnesium sulfate, and then concentrated under vacuum to dryness. The yield is 5.8 g. of product and having a melting point of 198°C.-201°C. This product was additionally purified by slurrying in 50 ml. of $CHCl_3$ followed by filtration and washing with additional $CHCl_3$. This yields 4.33 g. of product having a melting point of 207°C.-208°C.

The following additional compounds are prepared by employing $PCl_5$ reagent in accordance with the method of the above Example VIII. An analogous quantity of the appropriate benzoylacrylic acid or a substituted benzoylacrylic acid is employed in the manner of the benzoylacrylic acid of Example VII. Likewise, an analogous quantity of the appropriately substituted aniline is employed in the manner of the 2,6-dichloroaniline. Thus, to prepare 3-(benzoyl)pentafluoroacrylanilide, an analogous amount of benzoylacrylic acid is employed and there is used an analogous quantity of pentafluoroaniline in place of the 2,6-dichloroaniline.

| Compounds | Melting Points |
| --- | --- |
| 3-(Benzoyl)pentafluoroacrylanilide | 167°–169°C. |
| 3-(Benzoyl)-2',4',6'-trichloroacrylanilide | 214°–215°C. |
| 3-(Benzoyl)-2',4',5',6'-tetrachloroacrylanilide | 214°–216°C. |
| 3-(Benzoyl)-2',6'-dibromoacrylanilide | 243°–244°C. |
| 3-(Benzoyl)-2',6'-dimethyl-4-nitroacrylanilide | 221°–222°C. |
| 3-(3,4-Dichlorobenzoyl)-2',6'-dichloroacrylanilide | 204°–206°C. |
| 3-(Benzoyl)pentafluoroacrylanilide | 166°–168°C. |
| 3-(Benzoyl)-2',6'-dichloroacrylanilide | 208°–209°C. |
| 3-(Benzoyl)-2'-cyanoacrylanilide | 164°–185°C. |

EXAMPLE IX 3-(Benzoyl)-2,6-dimethylacrylanilide

There is dissolved in 25 ml. of tetrahydrofuran 1.8 g. of benzoylacrylic acid followed by the addition of 1.2 g. of 2,6-dimethylaniline. To the reaction mixture is then added 2.2 g. of dicyclohexylcarbodiimide. The resulting clear solution is agitated for two hours. A precipitate forms during this period and this precipitate removed by filtration and then washed with tetrahydrofuran. After drying under vacuum there is obtained 9/10 g. of N,N'-dicyclohexylureau.

The filtrate from the above procedure is treated with 2 ml. of glacial acetic acid and then allowed to stand for ½ hour at room temperature to convert any unreacted dicyclohexylcarbodiimide to dicyclohexylurea. The solution is then again filtered and the filtrate stripped under vacuum. The residue is dissolved in 700 ml. benzene and washed with 188 ml. of cold one normal HCl followed by a wash with an equal volume of water and then an equal volume of aqueous 5 percent sodium bicarbonate. The benzene solution is dried over anhydrous magnesium sulfate, filtered and stripped under vacuum. The residue is dissolved in hot benzene and crystallized. There is obtained 0.4 g. of 3-(benzoyl)-2',6'-dimethylacrylanilide having a melting point of 209°C.-211°C.

In a procedure analagous to that of Example II, but substituting in place of the 2,6-dimethylaniline an equivalent amount of 2,6-diisopropylaniline or 2,6-diethylaniline, there is obtained 3-(benzoyl)-2',6'-diisopropylacrylanilide, and 3-(benzoyl)-2',6'-diethylacrylanilide.

EXAMPLE X 3-(Mesitoyl)-2',6'-dimethylacrylanilide

In 25 ml. of tetrahydrofuran there is dissolved 2.2 g. of 3-(mesitoyl)acrylic acid and 1.2 g. of 2,6-dimethylaniline is added to the reaction mixture followed by addition of 2.2 g. of dicyclohexylcarbodiimide. A gradual precipitation occurs and after two hours the reaction mixture is filtered by suction. The solution is treated with 2 ml. of glacial acetic acid for 15 minutes, filtered and the filtrate is stripped under reduced pressure and the residue dissolved in 500 ml. benzene. The solution is then washed with 90 ml. of 1/10 normal HCl followed by 90 ml. of water, and finally 90 ml. of aqueous 5 percent sodium bicarbonate. The benzene solution after filtration is dried under magnesium sulfate, and stripped to dryness. A 0.7 g. aliquot of the residue is dissolved in 10 ml. benzene and crystallized. There is obtained 0.25 g. of 3-(mesitoyl)-2',6'-dimethylacrylanilide having a melting point of 190°C.-192°C.

In a manner analogous to that of Example X, but substituting an equivalent amount of
3-(3-toluyl)acrylic acid,
3-(4-toluyl)acrylic acid,
3-(4-isopropylbenzoyl)acrylic acid, and
3-(2,4,6-triisopropylbenzoyl)acrylic acid, respectively for the 3-(2,4,6-mesitoyl)acrylic acid and employing an analogous quantity of 2,6-dimethylaniline, there is obtained
3-(3-toluyl)-2',6'-dimethylacrylanilide,
3-(4-toluyl)-2',6'-dimethylacrylanilide,
3-(4-isopropyl)-2',6'-dimethylacrylanilide,
3-(2,4,6-triisopropylbenzoyl)-2',6'-dimethylacrylanilide,
and
3-(2,5-di-t-butylbenzoyl)-2',6'-dimethylacrylanilide, respectively.

In addition, employing respectively an analogous quantity of

3(2,4-xyloyl)acrylic acid, and
3(2,5-xyloyl)acrylic acid, in place of the 3-(2,4,6-mesitolyl)acrylic acid, and employing an analogous quantity of 2,6-diethylaniline and 2-methyl-6-ethylaniline respectively in place of the 2,6-dimethylaniline, there is obtained
3-(2,4-xyloyl)-2',6'-diethylacrylanilide and
3-(2,5-xyloyl)-2-methyl-6-ethylacrylanilide.

Now having described this invention, it will be understood that any departure from the above description which conforms to the invention is intended to be included within the scope of the claims.

What is claimed is:

1. A composition for combatting coccidiosis which comprises a poultry ration containing from about 0.001 to 0.008 percent by weight of a 6-amino-(substituted benzyl)purine or an N'-oxide thereof of the formula:

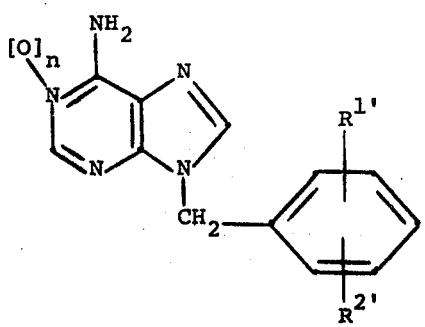

wherein $n$ is the integer 0 or 1, $R^{1'}$ and $R^{2'}$ are independently selected from the group consisting of hydrogen, halogen, nitro and trihalomethyl, provided that at least one of such substituents is other than hydrogen and no more than one of such substituents is nitro or trihalomethyl, and $R^{1'}$ and $R^{2'}$ are located in the 2 and 6 positions on the carbocyclic portion of the compound except when $R^{1'}$ and $R^{2'}$ are both methyl the groups are located in the 3 and 4 positions on the carbocyclic ring; in combination with from 0.002 to 0.1 percent parts by weight of a benzoylacrylanilide of the formula:

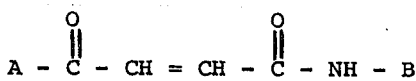

where A is

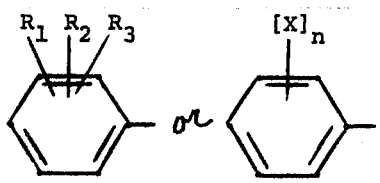

where $R_1$, $R_2$ and $R_3$ are independently hydrogen, halo, nitro, loweralkylsulfide, loweralkylsulfonyl, loweralkyl, loweralkoxy, loweralkanoylamino, trihaloloweralkyl, cyano, or hydroxyl; provided that at least one of $R_1$, $R_2$ and $R_3$ is other than nitro; X is halo; and n is an integer of 4 or 5; and where B is

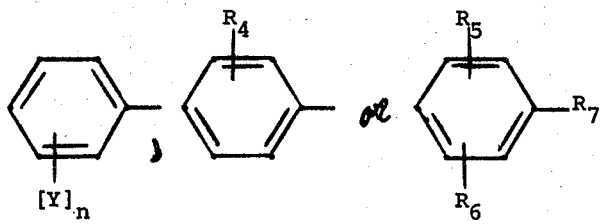

where Y is halo, and n is as previously defined; $R_4$ is cyano, halo, nitro, loweralkyl, loweralkoxy, loweralkylsulfide, trihaloloweralkyl, or hydroxyl; $R_5$ and $R_6$ are independently loweralkyl, or halo; and $R_7$ is halo, nitro, or hydrogen.

2. The composition according to claim 1 where said benzoylacrylanilide is 3-(3,4-dichlorobenzoyl)-2',6'-dimethylacrylanilide, and said 6-amino-9-(substituted benzyl)purine is 6-amino-9-(2,6-dichlorobenzyl)purine.

3. A method for combatting coccidiosis in poultry which comprises orally administering to poultry a ration containing from about 0.001 to .008 percent by weight of a 6-amino-9-(substituted benzyl) purine or an N'-oxide thereof of the formula:

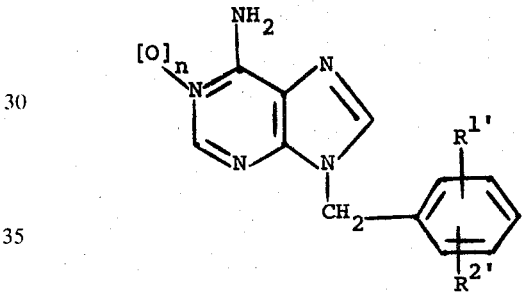

wherein n is the integer 0 or 1, $R^{1'}$ and $R^{2'}$ are independently selected from the group consisting of hydrogen, halogen, nitro and trihalomethyl, provided that at least one of such substituents is other than hydrogen and no more than one of such substituents is nitro or trihalomethyl, and $R^{1'}$ and $R^{2'}$ are located in the 2 and 6 positions on the carbocyclic portion of the compound except when $R^{1'}$ and $R^{2'}$ are both methyl the groups are located in the 3 and 4 positions on the carbocyclic ring; in combination with from 0.002 to 0.1 percent by weight of a benzoylacrylanilide of the formula:

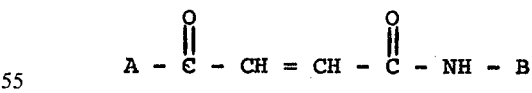

where A is

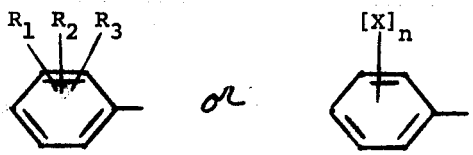

where $R_1$, $R_2$, and $R_3$ are independently hydrogen, halo, nitro, loweralkylsulfide, loweralkylsulfonyl, loweralkyl, loweralkoxy, loweralkanoylamino, trihaloloweralkyl, cyano or hydroxyl; provided that at least one of $R_1$, $R_2$, and $R_3$ is other than nitro X is halo; and n is an integer of 4 or 5; and where B is

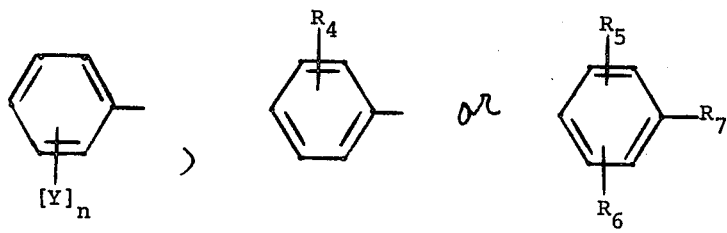

where Y is halo, and n is as previously defined; $R_4$ is cyano, halo, nitro, loweralkyl, loweralkoxy, loweralkylsulfide, trihaloloweralkyl, or hydroxyl; $R_5$ and $R_6$ are independently loweralkyl, or halo; and $R_7$ is halo, nitro or hydrogen.

4. The method according to claim 3 wherein the ration comprises from 0.002 to 0.006% of said 6-amino-9-(substituted benzyl)purine or N'-oxide thereof.

5. The method according to claim 3 in which $R^{1'}$ and $R^{2'}$ are halogen.

6. The method according to claim 3 where the 6-amino-(substituted benzyl)purine is 6-amino-9-(2,6-dichlorobenzyl)purine.

7. The method according to claim 3 in which said benzoylacrylanilide is a compound where $R_1$ is hydrogen and $R_2$ and $R_3$ are independently halogen, nitro, loweralkylsulfide, loweralkylsulfonyl, loweralkyl, loweralkoxy, loweralkanoylamino, trihaloloweralkyl, cyano or hydroxyl.

8. The method according to claim 7 where $R_2$ and $R_3$ are in the 2- and 4-positions respectively.

9. The method according to claim 7 where $R_2$ and $R_3$ are in the 3- and 4-positions respectively.

10. The method according to claim 9 where $R_2$ and $R_3$ are the same and are halo, loweralkoxy or loweralkyl.

11. The method according to claim 7 where $R_5$ and $R_6$ are methyl in the 2'- and 6'-positions.

12. The method according to claim 11 where $R_4$ is loweralkyl in the 2'-position.

13. The method according to claim 6 where said benzoylacrylanilide is 3-(3,4-dichlorobenzoyl)-2',6'-dimethylacrylanilide.

* * * * *